UNITED STATES PATENT OFFICE.

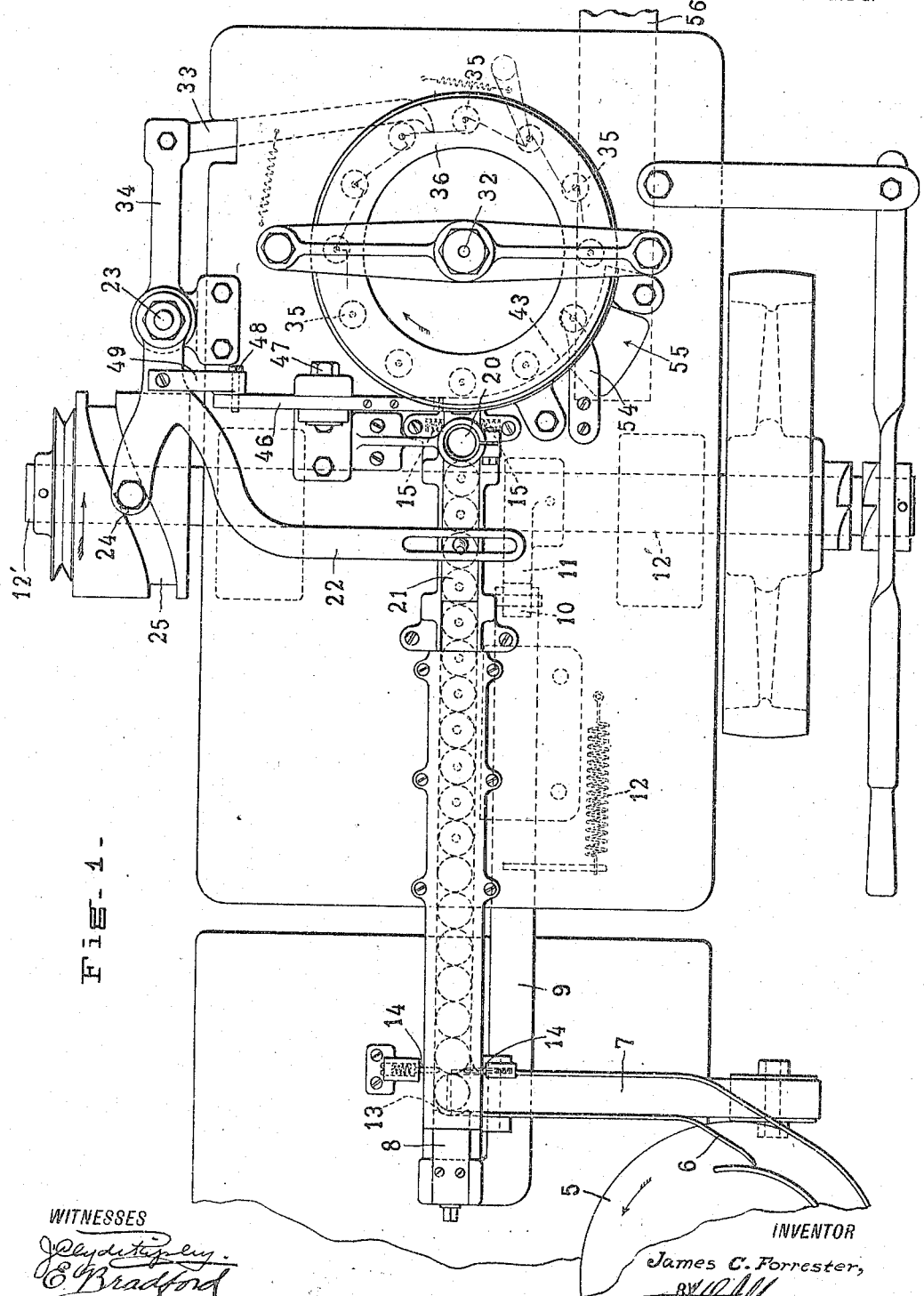

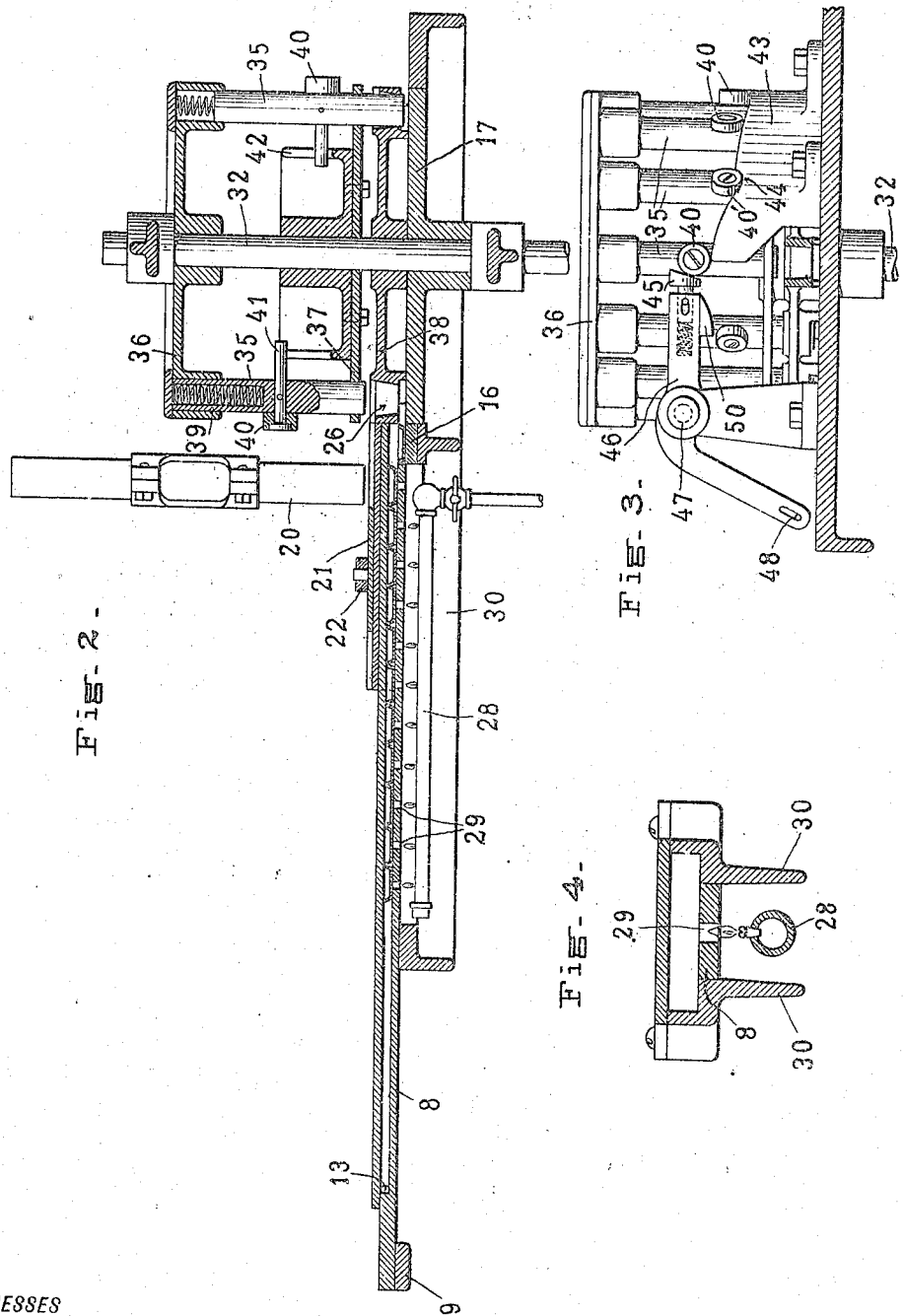

JAMES C. FORRESTER, OF NEW YORK, N. Y.

BOTTLE-CAP-ASSEMBLING MACHINE.

1,135,513.   Specification of Letters Patent.   Patented Apr. 13, 1915.

Application filed January 23, 1913. Serial No. 743,749.

*To all whom it may concern:*

Be it known that I, JAMES C. FORRESTER, a citizen of the United States of America, and residing at New York, in the county of New York and State of New York, have invented new and useful Improvements in Bottle-Cap-Assembling Machines, of which the following is a specification.

My invention relates particularly to a machine for assembling the different parts of a bottle cap for instance, the metallic member or " tin " as it is usually called, the sticking material, usually prepared paper, and the closing material, usually cork.

The special object is to assemble the tin, paper and cork permanently in one machine, rapidly, securely and efficiently.

Briefly the invention contemplates feeding and heating the tins, inserting the paper, either before, during or after heating, but preferably before heating, driving a cork into a tin by a hard blow, squeezing the parts together to insure complete sticking and then ejecting the finished cap.

In the form of mechanism illustrated the tins are fed from a rapidly rotated dial onto a transfer belt which delivers them successively to a feeding slide. The paper is placed in the tins in any convenient manner. The slide is heated so as to heat the tins as they are fed along the slide. The heated tins soften the prepared paper. The corks are fed intermittently into position above the tins and driven downward against the tacky paper into the tins by spring pressed plungers, the parts thus assembled are stuck at the same time. The sticking or sealing papers may be placed in the tins by hand or automatically in any suitable manner at any time prior to the time that the tins are fed under the corks, but preferably before heating the tins. After the plunger drives a cork by spring pressure into a tin, a mechanical pressure by means of a lever is applied to the plunger to squeeze the cork in the tin. A number of plungers are carried by a turret which rotates intermittently so that a tin is fed and a cork assembled and stuck at each stroke of the successively rotating turret plungers. As the turret rotates the plungers are successively lifted by a cam and the completed caps directed from the turret to a belt which carries them to a suitable inspecting table.

Figure 1, is a plan view of the principal parts of a machine embodying the improvements of my invention, Fig. 2, is a vertical longitudinal section of the same through the feeding and heating slide. Fig. 3 is a front view of the squeezing device and showing the plunger lifting cam. Fig. 4, is a cross sectional view of the tin feeding and heating chute.

The tins or shells are inspected on a suitable table (not shown) and fed onto a suitable rotating dial 5. From this they are directed by a flange 6 on to a belt 7, operated by suitable means and which delivers them on to the reciprocating feeding slide 8. The arm 9 which is secured to the outer end of the feeding slide 8 has a roller 10 pressed against the cam 11 for instance by a spring 12. The cam 11 is on the main drive shaft 12′ so that as this shaft rotates, the arm 9 and the slide 8 are reciprocated. The slide 8 has a shoulder 13 for engaging the successive tins to feed them forwardly. A pair of spring pressed plungers 14, 14 serve to prevent the tins from moving backward with the slide on which they rest. As the slide is moved forward the spring pressed plungers 15 are interposed behind the end tin and thus hold and prevent it going back with the slide. As the slide moves back, the end tin is thus held and drops onto the support 16 in front of the rotating turret. This turret has a moving table member 17 adapted to receive the tins which are fed forwardly intermittently from the support 16 as the slide moves forward.

The corks are supplied in a chute 20 and fed forwardly intermittently from the bottom by a feeding slide 21. This slide 21 is operated by an arm 22 pivoted at 23 and which has a roller 24 operated in a groove of the cam 25. This cam is on the shaft 12′ and swings the arm 22 backward and forward once at each rotation of the shaft. The cork feeding slide and the tin feeding slide are thus operated synchronously. Each cork is fed into the top of the tapering passage 26 immediately above the tins. A paper disk having a sticking composition has been inserted in each tin at a convenient time prior to insertion of the cork.

The tins are heated in the feeding chute on the slide 8 in any convenient manner for instance, by means of a burner 28. The bottom of the slide may have a series of openings such as 29 for the heat to more directly pass through to the tins. The chute may also have lateral flanges 30, 30 to confine the heat. The temperature may be regulated as required by the particular necessities of the materials employed and the speed of operation. The hot tin softens the prepared paper so that it is ready to stick the cork the instant the cork is inserted.

The turret is rotated on the shaft 32 intermittently by the action of a pawl 33 connected to the arm 34 of the cam operated lever pivoted at 23, so that the turret is rotated step by step at each feeding stroke of the tins and corks. The turret carries a series of plungers 35 which are guided in a plate 36 at the top and in a plate 37 near the bottom just above the plate 38 which has the tapering cork passages 26. The lower end of each plunger is suitably shaped to apply a pressure on the cork in the proper manner. Each plunger is pressed downward by a spring 39 which is housed within the upper end of the plunger and the plate 36. Each plunger carries a roller 40 on a shaft 41 which is vertically guided in the slot 42 so as to prevent the plunger from rotating. The cam 43 is secured at one side of the turret for raising these rollers. The instant the tin and cork are fed into position in the turret a plunger is held above them by the roller 40 which rests on the tip of the cam 43. The turret is prevnted from turning backward by another one of the rollers 40' resting in a notch 44 in the cam 43. The turret is stopped in proper position by the yielding stop 45 which intercepts the roller 40. As the cork is inserted in the turret, the stop 45 is raised and as the turret is rotated clockwise, the roller 40 drops off to the left from the tip of the cam 43 and striking the cork beneath it drives it into the tin on the table 17, striking a sharp blow. The tapered guide 26 contracts the edge of the cork so that it is uniformly fed into the tin. The lever 46, pivoted at 47, is connected by a pin and slot engagement 48 to a projection 49 from the arm 22 so that as the arm oscillates, the lever 46 is rocked. The lever 46 carries the yielding stop 45, previously referred to, and also has a cam face 50 below its right hand end. The arrangement and proportions of the parts are such that when the roller 40 drops down from the tip of the cam 43, the lever 46 is tilted and rocks its right hand end and cam 50 down onto the roller 40 so as to force the roller and plunger 39 downward and positively squeeze the cork into the tin. This distributes the sealing and sticking material so that the parts are uniformly united.

As the turret rotates, the rollers and their plungers are successively lifted by the right hand and 52 of the cam 43. This releases the finished caps which are directed outwardly from the turret by the finger 54. They thereupon fall through the opening 55 onto a suitably operated belt 56 which conveys them out onto an inspecting table, not shown.

By this machine the assembling of the caps is done rapidly and the parts are securely united.

What I claim is:—

1. In a cap assembling machine, a movable support, means for heating and feeding heated tins periodically to said support, means for supporting sealing disks above the heated tins on said support, means for feeding sealing disks to the said disk-supporting means in position above the heated tins on said support, means movable with said support for driving the disks thus supported into said tins and means for retracting said driving means.

2. In a cap assembling machine, a tin feeding chute, means for heating said chute and means located at the end of said chute for forcing a cork into a heated tin issuing from the chute.

3. In a cap assembling machine, means for heating a tin, means for moving the heated tin away from the heating means and means for assembling a cork into the heated tin and squeezing said cork therein.

4. In a cap assembling machine, means for heating a tin, means for positioning a cork above the heated tin, a plunger and means operating the same to drive the cork thus positioned into the heated tin.

5. In a cap assembling machine, means for heating a tin, a plunger and means operating the same to drive a cork into the heated tin and means for forcing the plunger to squeeze the cork momentarily in the tin after the driving blow.

6. In a cap assembling machine, a heated tin chute, a series of vertically movable plungers at the end of said heated tin chute to operate on the heated tins delivered by said chute, a movable table under said plungers, tapered guide-ways between said plungers and said table, means for feeding tins through the chute to said table beneath said guide-ways, means for feeding corks to the upper ends of said tapered guide-ways and means for operating said plungers to drive said corks through said tapered guide-ways into said tins.

7. In a cap assembling machine, a rotatable turret having a table for supporting tins and means for supporting corks, a series of vertically movable plungers above said table, means for heating and feeding heated tins to said table beneath said plungers, means for feeding corks into position above the heated tins on the table and means for operating said plungers to drive the corks thus supported into said tins.

8. In a cap assembling machine, a rotatable turret having a table, a series of vertically movable cork-driving plungers above said table, means for heating and feeding heated tins to said table beneath said plungers, means for feeding corks to said turret beneath said plungers and above said tins, means operating the plungers to drive the corks into the tins and means for giving an additional squeezing pressure to each plunger after its driving stroke.

9. In a cap assembling machine, means for heating and feeding tins, means for supporting corks above but out of contact with the heated tins, spring pressed plungers above the cork supporting means and disposed in line with the corks supported thereby and means for retracting and releasing the spring pressed plungers whereby to cause said plungers to drive the supported corks into the heated tins.

10. In a cap assembling machine, means for feeding and heating tins, a turret including a supporting table and a series of vertically movable plungers, a cam for lifting said plungers having a cut away portion cooperating with one of said plungers to prevent backward rotation of said turret and a yielding member to limit the forward rotation.

11. In a cap assembling machine, means for feeding and heating tins, a turret including a supporting table and a series of vertically movable plungers, a cam for lifting said plungers having a cut away portion cooperating with one of said plungers to prevent backward rotation of said turret and a yielding member to limit the forward rotation and means for exerting a squeezing pressure upon one of said plungers at a time.

12. In a cap assembling machine, a series of vertically movable spring pressed plungers, a cam for lifting said plungers, a rocking lever for exerting a squeezing pressure on one of said plungers after it is released from said cam and means for moving said plunger to release it from said cam and for operating said lever.

13. In a cap assembling machine, means for feeding tins, means for heating said feeding means and said tins, means for positioning corks at normal atmospheric temperature over the heated tins and means for driving the thus positioned cooler corks into the heated tins.

14. In a cap assembling machine, means for feeding tins, means for heating said feeding means and said tins, means for positioning corks at normal atmospheric temperature over the heated tins, means for driving the thus positioned cooler corks into the heated tins and means for applying an additional pressure for squeezing each cork after it is driven into its tin.

15. In a cap assembling machine, an assembling turret including vertically reciprocable spring pressed plungers, a cam for lifting said plungers, and a rocking lever having a yielding stop for said plungers to limit rotation of said turret and said lever also having a cam face for pressing said plungers downward.

16. In a cap assembling machine, an assembling turret including vertically reciprocable spring pressed plungers, a cam for lifting said plungers, and a rocking lever having a yielding stop for said plungers to limit rotation of said turret and said lever also having a cam face for pressing said plungers downward and means for feeding tins and corks beneath said plungers.

17. In a cap assembling machine, the combination with means for feeding the tins, of means for heating the tins advanced by said feeding means, an assembling device independent of the heating means and arranged to receive the heated tins after the heating thereof has been discontinued and means for positioning the corks above the tins taken by the assembling device, said assembling device having means for forcing the corks into the tins and holding the corks therein under pressure.

18. In a cap assembling machine, the combination of means for feeding the tins, means for heating the tins advanced by said feeding means, an assembling device including a table separate and independent from the heating means arranged to receive and support the tins after the heating thereof has been discontinued and plungers disposed above the table, means for positioning the corks above the tins supported on the table, and means operating the plungers to drive said corks into the tins and hold them under pressure therein.

19. In a cap assembling machine, means for heating the tins, an assembling device separate from said heating means, including a supporting table and punches supported above the same, means for feeding the tins after being heated onto the assembling table, means for feeding corks to the tins and means operating the punches to unite the corks with the tins.

20. In a cap assembling machine, an assembling device, means for feeding tins to the assembling device, means for feeding corks to the tins and heating means separated from the assembling device and arranged to heat the tins and discontinue heating of the same prior to the time that such tins are taken by the assembling device, whereby the assembling device will remain relatively cool and the caps assembled by such device will cool rapidly.

21. In a cap assembling machine, a movable assembling table, means for feeding the tins onto said table, movable means for supporting corks above such tins, assembling punches above and movable with the table and means operating said punches to drive the corks thus supported into the tins and hold them under pressure until united with such tins.

22. In a cap assembling machine, means for heating the tins, means for holding the corks under pressure in the tins, means for releasing said holding means from engagement with the corks, and means for applying an additional pressure to the said holding means to thereby squeeze the corks within the tins.

23. In a cap assembling machine, means for holding the corks under pressure in the tins, means for releasing said holding means from engagement with the corks and means for applying additional squeezing pressure to said holding means to thereby squeeze the corks within the tins before releasing the holding means from engagement therewith.

24. In a cap assembling machine, a plunger, means holding said plunger under pressure in holding engagement with a cork in a tin, means for applying additional pressure to said plunger to thereby squeeze the cork with added force in the tin and means for releasing the plunger from engagement with the cork in the tin.

25. In a cap assembling machine, a plunger, means for feeding tins beneath the plunger, means for positioning corks beneath the plunger and above the tins, means for driving the plunger into engagement with the corks to thereby force the corks into the tins, means for applying pressure to the plunger to squeeze the corks into the tins and means for releasing the plunger from engagement with the corks in the tins.

26. In a cap assembling machine, an assembling turret including a rotatable table provided with pockets in the periphery thereof to receive the tins, peripheral seats above said pockets to receive the corks, tapered guideways extending down from the cork seats to the tin pockets and plungers above the cork seats adapted to drive the corks down through the tapered guideways into the tins supported in the tin pockets, means for feeding tins into the tin pockets and means for feeding corks to the cork seats.

27. In a cap assembling machine, a heated tin chute, a vertically movable plunger at the end of said heated tin chute to operate on the heated tins delivered by said chute, a table under said plunger, a tapered guideway between said plunger and said table, means for feeding corks to the upper end of said tapered guideway, and means for operating said plunger to drive said corks through said tapered guideway into the tins.

28. In a cap assembling machine, means for feeding and heating tins, a turret including a supporting table and a series of vertically movable plungers and a cam for lifting said plungers having a cut away portion coöperating with one of said plungers to prevent backward rotation of said turret.

JAMES C. FORRESTER.

Witnesses:
P. A. S. ALLYN,
E. BRADFORD.